US012633759B2

(12) United States Patent
Huang et al.

(10) Patent No.: US 12,633,759 B2
(45) Date of Patent: May 19, 2026

(54) POWER SUPPLY DRIVE CIRCUIT, CHIP AND METHOD

(71) Applicant: Fremont Micro Devices Corporation, Shenzhen (CN)

(72) Inventors: Chong Huang, Shenzhen (CN); Yuquan Huang, Shenzhen (CN); Kelvin Yupak Hui, Shenzhen (CN)

(73) Assignee: Fremont Micro Devices Corporation, Shenzhen (CN)

( * ) Notice: Subject to any disclaimer, the term of this patent is extended or adjusted under 35 U.S.C. 154(b) by 716 days.

(21) Appl. No.: 18/169,859

(22) Filed: Feb. 15, 2023

(65) Prior Publication Data

US 2023/0299608 A1     Sep. 21, 2023

(30) Foreign Application Priority Data

Mar. 21, 2022     (CN) .......................... 202210281318.6

(51) Int. Cl.
| | |
|---|---|
| *H02J 7/06* | (2006.01) |
| *H02M 1/00* | (2007.01) |
| *H02M 3/335* | (2006.01) |

(52) U.S. Cl.
CPC ............. *H02J 7/06* (2013.01); *H02M 1/0009* (2021.05); *H02M 3/33523* (2013.01); *H02J 2207/20* (2020.01)

(58) Field of Classification Search
CPC ........ H02M 1/0009; H02M 1/36; H02M 1/08; H02M 3/33507; H02M 3/33523; H02J 7/06; H02J 2207/20
See application file for complete search history.

(56) References Cited

U.S. PATENT DOCUMENTS

| | | | | |
|---|---|---|---|---|
| 11,424,683 | B2 * | 8/2022 | Hui .......................... | H02M 1/44 |
| 12,051,936 | B2 * | 7/2024 | Yang ................. | H02M 3/33507 |
| 2023/0299607 | A1 * | 9/2023 | Yang ........................ | H02J 7/007 |
| 2023/0299608 | A1 * | 9/2023 | Huang ..................... | H02M 1/36 |
| | | | | 320/137 |
| 2023/0299766 | A1 * | 9/2023 | Huang ................. | H03K 17/567 |
| | | | | 327/575 |

* cited by examiner

*Primary Examiner* — Crystal L Hammond
*Assistant Examiner* — Nicolas Alden Chapa Mills

(57) ABSTRACT

Disclosed is a power supply drive circuit, chip and method. In each switching-on cycle, the charging demand is considered. If the current switching-on cycle requires charging, after the drive tube is completely switched on in the current switching-on cycle, the sampling switch tube is switched off and the charging switch tube is switched on for using a small current which flows through the drive tube in the early stage of the switching-on cycle for charging. In the later stage of the current switching-on cycle, the sampling switch tube is switched on and the charging switch tube is switched off, such that the current outputted by the drive tube flows through the current sampling switch tube according to the normal path. In this way, the power supply voltage never changes with the output power, the cumbersome design and debugging of the power supply circuit are avoid.

18 Claims, 5 Drawing Sheets

POWER SUPPLY DRIVE CIRCUIT, CHIP AND METHOD

CROSS REFERENCE TO RELATED APPLICATIONS

The present application claims the benefit of Chinese Patent Application No. 202210281318.6 filed on Mar. 21, 2022, the contents of which are incorporated herein by reference in their entirety.

TECHNICAL FIELD

The present disclosure relates generally to a power supply technical field, and more particularly relates to a power supply drive circuit, chip and method.

BACKGROUND

As shown in FIG.1, a power supply system for a control chip of the prior art is composed of a start resistor Rst, a capacitor 65 with an equivalent series resistor (ESR) 64, a freewheel diode 60 and a transformer secondary winding NA. The operation for such power supply system is as follows. When the power supply system is turned on, the capacitor is charged through the start resistor Rst, and the chip is in a shutdown state at this time. When a power supply voltage VCC increases to a certain voltage which is preset by a controller, the control chip starts to operate, thus switching on the power transistor Q1 and starting to charge a primary inductor of the transformer. When a current of the primary inductor reaches a certain preset value, the control chip switches off the power transistor Q1, and the energy stored in the primary inductor is transferred to an output winding inductor and a secondary winding inductor to supply electrical power to an output load and the control chip respectively. The controller determines a next time point to switch on the transistor Q1 or a peak value of a primary current according to an output voltage. Then the whole process repeated again and again. In general, the control chip never makes any corresponding adjustment according to the power supply voltage VCC. After stabilization, the power supply voltage VCC is mainly determined by the output voltage, the number of the output winding NS and the number of the secondary winding NA, that is, the power supply voltage VCC≈Vo*NA/NS. However, due to the non-ideal factors of the transformer, the power supply voltage VCC not only changes with the change of the output voltage, but also increases with the increase of the output current and decreases with the decrease of the output current. This causes the power supply voltage VCC to change greatly under different loads, however, the power supply voltage range of the control chip is often not too large, which makes the design of the power supply circuit need many attempts and adjustments to achieve better results.

SUMMARY

The present disclosure has provided a power supply drive circuit, chip and method, aiming at the above-mentioned defect that the power supply voltage VCC changes greatly under different loads.

According to an aspect, a power supply drive circuit, is provided, which including:

a charging detection module, which is connected with an energy storage module, wherein the charging detection module is configured to detect a power supply voltage of the energy storage module and generate a self-charging signal when the power supply voltage is lower than a self-charging threshold;

a current sampling switch tube, which is connected with an output terminal of a drive tube, wherein an input terminal of the drive tube is connected with an input power supply and the output terminal of the drive tube is grounded through the current sampling switch tube;

a charging switch tube, wherein an input terminal of the charging switch tube is connected between the drive tube and the current sampling switch tube, and an output terminal of the charging switch tube is connected with the energy storage module;

a sampling detection module, wherein an input terminal of the sampling detection module is connected between the drive tube and the current sampling switch tube to acquire a current which flows from the drive tube to the current sampling switch tube for generating a sampled voltage; and a control module, which is connected with an output terminal of the sampling detection module to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;

wherein, each time the control module enters the switching-on cycle, if the control module fails to receive the self-charging signal, the control module is configured to be in a first switching-on control state after entering the switching-on cycle, wherein the first switching-on control state represents switching on the current sampling switch tube and switching off the charging switch tube;

wherein, each time the control module enters the switching-on cycle, if the control module receives the self-charging signal; the control module is configured to be in the first switching-on control state after entering the switching-on cycle, and to be switched to a second switching-on control state after the drive tube is completely switched on for using a current which flows through the drive tube during an early stage to charge the energy storage module, and to be switched back to the first switching-on control state after a preset charging duration; wherein the second switching-on control state represents switching off the current sampling switch tube and switching on the charging switch tube.

Preferably, each time the control module enters the switching-on cycle, if the control module receives the self-charging signal, the control module is configured to be in the first switching-on control state for a preset start duration after entering the switching-on cycle to guarantee that the drive tube is completely switched on, and then to be switched to the second switching-on control state.

Preferably, the preset start duration never exceeds 30% of the switching-on cycle or 400 ns, and/or the preset charging duration never exceeds 30% of the switching-on cycle.

Preferably, the preset start duration and the preset charging duration enable the sampled voltage to fail to reach a first reference voltage, when switching back to the first switching-on control state.

Preferably, the power supply drive circuit further includes:

a current input circuit, which is connected with the control terminal of the drive tube, wherein the current input circuit is configured to input a drive current to switch on the drive tube; and a discharging circuit, which is connected with the control terminal of the drive tube, wherein the discharging circuit is configured to discharge the control terminal of the drive tube.

Preferably, each time the control module enters the switching-on cycle, the control module is specifically configured to synchronously switch on the current input circuit and switch off the discharging circuit when switching on the current sampling switch tube;

each time after the control module enters the switching-on cycle, the control module is specifically configured to synchronously switch off the current input circuit when the control module is switched to the second switching-on control state, to synchronously switch on the current input circuit when the control module is switched back to the first switching-on control state; and each time after the control module enters the switching-on cycle, the control module is specifically configured to switch off the current input circuit for stopping driving the drive tube when the sampled voltage reaches a first reference voltage and to switch off the current sampling switch tube and synchronously control the discharging circuit to discharge for forcibly and completely switching off the drive tube to enable the drive tube to enter the switching-off cycle when the sampled voltage continues to increase to a second reference voltage.

Preferably, the drive tube is a Darlington transistor, which includes a primary transistor and a secondary transistor, wherein the discharging circuit includes a first discharging switch and a second discharging switch; wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

Preferably, the current input circuit includes a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

Preferably, the charging detection module includes a latch comparator, wherein one input terminal of the latch comparator receives the self-charging threshold, the other terminal of the latch comparator is connected to an output terminal of the energy storage module, and a control terminal of the latch comparator is connected to the control module;

wherein, the latch comparator is configured to detect the power supply voltage of the energy storage module, compare the power supply voltage with the self-charging threshold, generate the self-charging signal, latch a newly generated self-charging signal, and output the self-charging signal to the control module under a trigger of the control module at an beginning of a next switching-on cycle.

Preferably, the power supply drive circuit further includes a start resistor which is connected between the input terminal and the output terminal of the drive tube; wherein the input power supply is configured to charge the energy storage module through the start resistor and a parasitic diode of the charging switch tube when powering up, wherein the power supply drive circuit starts to operate when the power supply voltage increases to a preset voltage which is preset inside the control module.

According to a further aspect, a power supply drive chip is provided, which includes a power supply drive circuit, wherein the power supply drive circuit includes:

a charging detection module, which is connected with an energy storage module, wherein the charging detection module is configured to detect a power supply voltage of the energy storage module and generate a self-charging signal when the power supply voltage is lower than a self-charging threshold;

a current sampling switch tube, which is connected with an output terminal of a drive tube, wherein an input terminal of the drive tube is connected with an input power supply and the output terminal of the drive tube is grounded through the current sampling switch tube;

a charging switch tube, wherein an input terminal of the charging switch tube is connected between the drive tube and the current sampling switch tube, and an output terminal of the charging switch tube is connected with the energy storage module;

a sampling detection module, wherein an input terminal of the sampling detection module is connected between the drive tube and the current sampling switch tube to acquire a current which flows from the drive tube to the current sampling switch tube for generating a sampled voltage; and a control module, which is connected with an output terminal of the sampling detection module to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;

wherein, each time the control module enters the switching-on cycle, if the control module fails to receive the self-charging signal, the control module is configured to be in a first switching-on control state after entering the switching-on cycle, wherein the first switching-on control state represents switching on the current sampling switch tube and switching off the charging switch tube;

wherein, each time the control module enters the switching-on cycle, if the control module receives the self-charging signal; the control module is configured to be in the first switching-on control state after entering the switching-on cycle, and to be switched to a second switching-on control state after the drive tube is completely switched on for using a current which flows through the drive tube during an early stage to charge the energy storage module, and to be switched back to the first switching-on control state after a preset charging duration; wherein the second switching-on control state represents switching off the current sampling switch tube and switching on the charging switch tube.

Preferably, each time the control module enters the switching-on cycle, if the control module receives the self-charging signal, the control module is configured to be in the first switching-on control state for a preset start duration after entering the switching-on cycle to guarantee that the drive tube is completely switched on, and then to be switched to the second switching-on control state.

Preferably, the preset start duration never exceeds 30% of the switching-on cycle or 400 ns, and/or the preset charging duration never exceeds 30% of the switching-on cycle.

Preferably, the preset start duration and the preset charging duration enable the sampled voltage to fail to reach a first reference voltage, when switching back to the first switching-on control state.

Preferably, the power supply drive circuit further includes:

a current input circuit, which is connected with the control terminal of the drive tube, wherein the current input circuit is configured to input a drive current to switch on the drive tube; and a discharging circuit, which is connected with the control terminal of the drive tube, wherein the discharging circuit is configured to discharge the control terminal of the drive tube;

wherein each time the control module enters the switching-on cycle, the control module is specifically configured to synchronously switch on the current input circuit and switch off the discharging circuit when switching on the current sampling switch tube;

each time after the control module enters the switching-on cycle, the control module is specifically configured to synchronously switch off the current input circuit when the control module is switched to the second switching-on control state, to synchronously switch on the current input circuit when the control module is switched back to the first switching-on control state; and each time after the control module enters the switching-on cycle, the control module is specifically configured to switch off the current input circuit for stopping driving the drive tube when the sampled voltage reaches a first reference voltage and to switch off the current sampling switch tube and synchronously control the discharging circuit to discharge for forcibly and completely switching off the drive tube to enable the drive tube to enter the switching-off cycle when the sampled voltage continues to increase to a second reference voltage.

Preferably, the drive tube is a Darlington transistor, which includes a primary transistor and a secondary transistor, wherein the discharging circuit includes a first discharging switch and a second discharging switch; wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

Preferably, the current input circuit includes a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

Preferably, the charging detection module includes a latch comparator, wherein one input terminal of the latch comparator receives the self-charging threshold, the other terminal of the latch comparator is connected to an output terminal of the energy storage module, and a control terminal of the latch comparator is connected to the control module;

wherein, the latch comparator is configured to detect the power supply voltage of the energy storage module, compare the power supply voltage with the self-charging threshold, generate the self-charging signal, latch a newly generated self-charging signal, and output the self-charging signal to the control module under a trigger of the control module at an beginning of a next switching-on cycle.

Preferably, the power supply drive module further including a start resistor which is connected between the input terminal and the output terminal of the drive tube; wherein the input power supply is configured to charge the energy storage module through the start resistor and a parasitic diode of the charging switch tube when powering up, wherein the power supply drive circuit starts to operate when the power supply voltage increases to a preset voltage which is preset inside the control module.

According to another further aspect, a power supply drive method is provided, which including:

each time entering a switching-on cycle, if a power supply voltage is no lower than a self-charging threshold, configurating a first switching-on control state after entering the switching-on cycle, wherein the first switching-on control state represents switching on a current sampling switch tube and switching off a charging switch tube;

each time entering the switching-on cycle, if the power supply voltage is lower than the self-charging threshold, configurating the first switching-on control state after entering the switching-on cycle firstly, and switching to a second switching-on control state after a drive tube is completely switched on for using a current which flows through the drive tube during an early stage to charge an energy storage module, and then switching back to the first switching-on control state after a preset charging duration; wherein the second switching-on control state represents switching off the current sampling switch tube and switching on the charging switch tube.

The power supply drive circuit, chip and method according to this disclosure has following technical effects. In each switching-on cycle, the charging demand is considered. If the current switching-on cycle requires charging, after the drive tube is completely switched on in the current switching-on cycle, the sampling switch tube is switched off and the charging switch tube is switched on for using a small current which flows through the drive tube in the early stage of the switching-on cycle for charging. In the later stage of the current switching-on cycle, the sampling switch tube is switched on and the charging switch tube is switched off, such that the current outputted by the drive tube flows through the current sampling switch tube according to the normal path. In this way, not only the power supply voltage never changes with the output power, the cumbersome design and debugging of the power supply circuit are avoid, but also the charging of the whole circuit or chip is realized without affecting the switching cycle of the drive tube. In addition, this charging method uses small currents of multiple cycles for charging, which greatly improves the influence of the energy storage capacitor ESR on the power supply voltage, effectively expands the ESR application scope, and enables to employ the standard low-voltage CMOS process. In additional, the energy storage module can be realized by replacing the expensive chip capacitor with the cheap electrolytic capacitor, which saves the system cost, improves the reliability and has wide applicability.

BRIEF DESCRIPTION OF THE DRAWINGS

In order to illustrate the embodiments of the present disclosure or the technical solutions in the prior art more clearly, the drawings needed in the description of the embodiments or the prior art will be briefly introduced. It is obvious that the drawings in the following description are only the embodiments of the present disclosure, and for one skilled in the art, other drawings can be obtained from the following attached drawings without paying creative labor.

DETAILED DESCRIPTION OF THE PREFERRED EMBODIMENT

Figure 1:
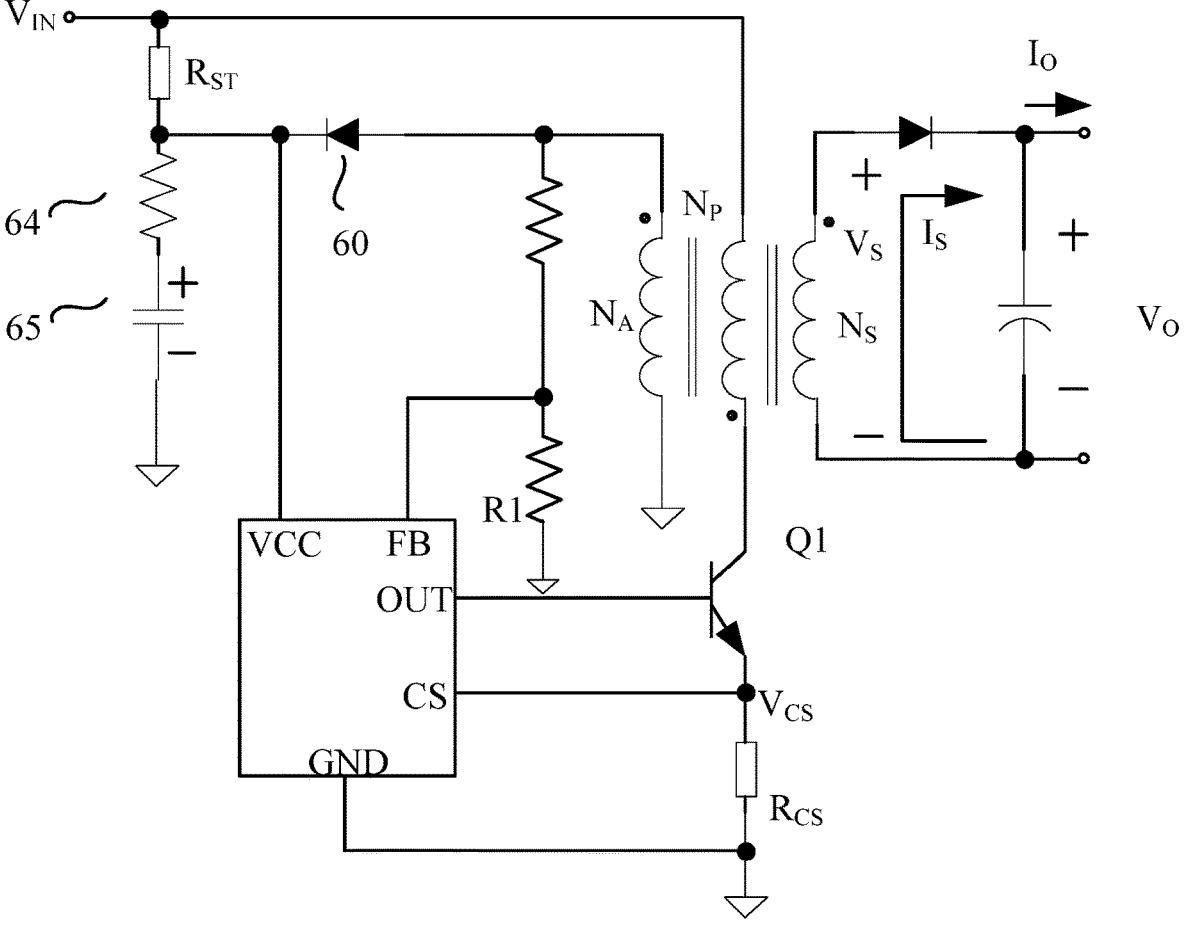
FIG. 1 is a structural diagram of a chip power supply structure of AC-DC circuit in ESR topology according to the prior art.

In order to facilitate the understanding of the present disclosure, a more comprehensive description of the present disclosure will be given as follows with reference to the relevant drawings. Typical embodiments of the present disclosure are shown in the drawings. However, the present disclosure can be implemented in many different forms and is not limited to the embodiments described herein. On the contrary, the purpose of providing these embodiments is to make the description of the present disclosure more thorough and comprehensive.

Unless otherwise defined, all technical and scientific terms used herein have the same meanings as those commonly understood by one skilled in the art of the present disclosure. The terms used in the description of the present disclosure are only for the purpose of describing specific embodiments, and are not intended to limit the present disclosure.

The terms "first", "second" and other ordinal numbers used in this specification can be used to describe but not limit the various constituent elements. The purpose of using these terms is to distinguish one constituent element from the other. For example, without departing from the scope of the present disclosure, the first constituent element can be named as the second constituent element, and similarly, the second constituent element can also be named as the first constituent element. The "connect with" or "connect to" mentioned herein not only includes the direct connection of two entities, but also includes the indirect connection through other entities with beneficial improvement effect. The terms "at the same time", "synchronous" or other similar terms are not limited to absolute equal or identical in mathematical terms. When implementing the embodiments described in this disclosure, they can be similar in engineering sense or within acceptable error range.

In order to solve the technical problem that the power supply voltage VCC changes greatly under different loads, the present disclosure has provided a power supply drive circuit, which is connected to a drive tube for implementing a power supply drive and charging an energy storage module. In this disclosure, the drive tube and a current sampling switch tube, which are connected in series, are connected between an input power supply and the ground. During normal operation, the control module can implement a feedback control on the drive tube based on the sampled voltage to enable the drive tube to be periodically in the switching-on cycle and the switching-off cycle. When the power supply of the energy storage module is insufficient, the charging detection circuit outputs a self-charging signal. If the control module receives the self-charging signal when entering the switching-on cycle, it switches on the current sampling switch tube and switches off the charging switch tube after entering the switching-on cycle, and then switches off the current sampling switch tube and switches on the charging switch tube after the drive tube is completely switched on for using a small current which flows through the drive tube during an early stage to charge the energy storage module, and then returns back to switch on the current sampling switch tube and switch off the charging switch tube after a preset charging duration. In this way, not only the power supply voltage never changes with the output power, the cumbersome design and debugging of the power supply circuit are avoid, but also the charging of the whole circuit or chip is realized without affecting the switching cycle of the drive tube. In addition, this charging method uses small currents of multiple cycles for charging, which greatly improves the influence of the energy storage capacitor ESR on the power supply voltage, effectively expands the ESR application scope, and enables to employ the standard low-voltage CMOS process. In additional, the energy storage module can be realized by replacing the expensive chip capacitor with the cheap electrolytic capacitor, which saves the system cost, improves the reliability and has wide applicability.

In order to better understand the above technical scheme, the above technical scheme will be described in detail in combination with the drawings of the specification and the specific embodiments. It should be understood that the embodiment of the present disclosure and the specific features in the embodiment are the detailed description of the technical scheme of the present disclosure, not the limitation of the technical scheme of the present disclosure. In the case of no conflict, the embodiment of the present disclosure and the technical features in the embodiment can be combined with each other.

Figure 2:
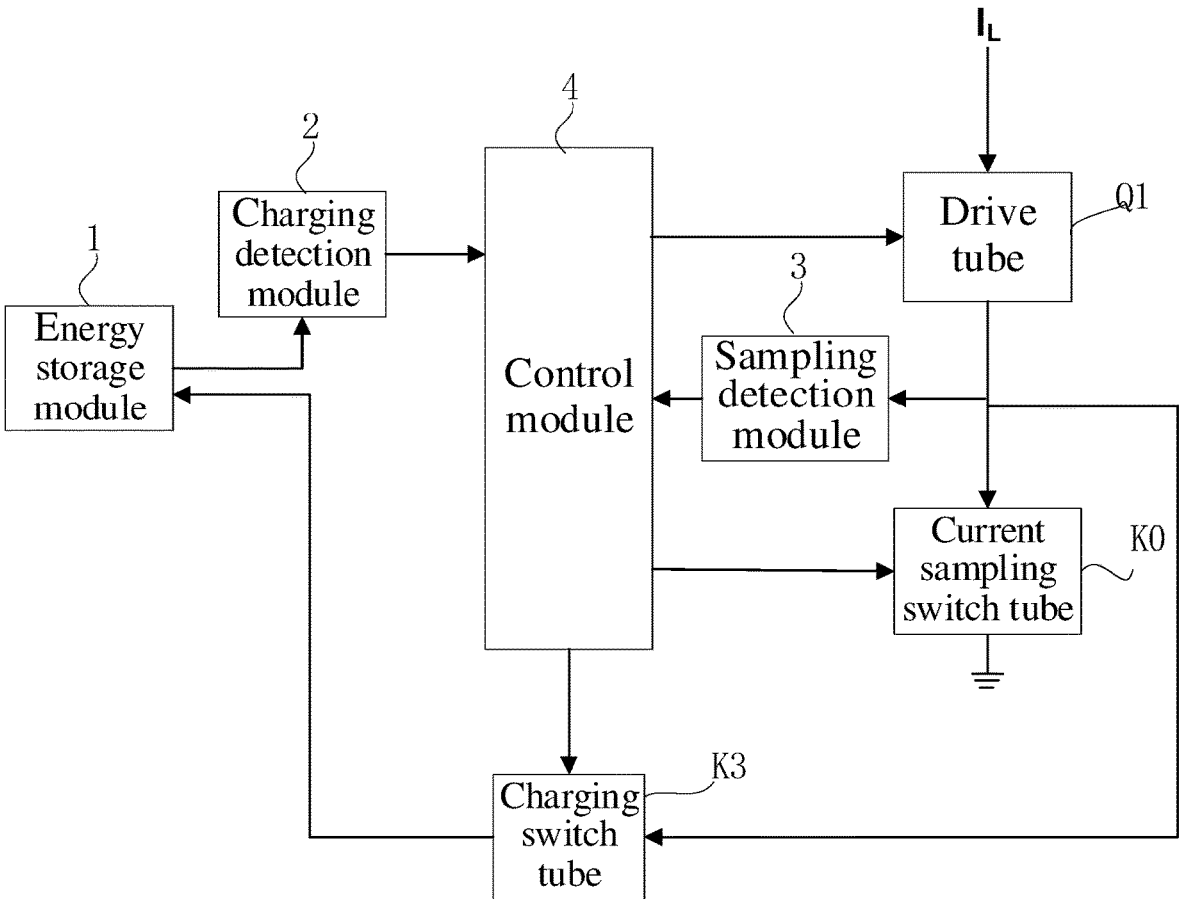
FIG. 2 is a structural diagram of a power supply drive circuit according to a preferable embodiment of this disclosure.

The power supply drive circuit of this disclosure can be applied to AC-DC, DC-DC and other power supply chips. Referring to FIG.2, the power supply drive circuit can be applied to control a drive tube Q1 to be switched on or off periodically to realize the power supply drive, and can also be applied to charge an energy storage module 1. The energy storage module 1 is configured to provide the power supply voltage VCC. For example, the energy storage module 1 is a capacitor which is connected external to the chip. The power supply drive circuit of this disclosure can be integrated into a drive chip of the power supply or externally connected to the drive chip of the power supply, thus forming the power supply drive chip of this disclosure.

The power supply drive circuit of this disclosure includes a charging detection module 2, a current sampling switch tube K0, a charging switch tube K3, a sampling detection module 3 and a control module 4.

Figure 4:
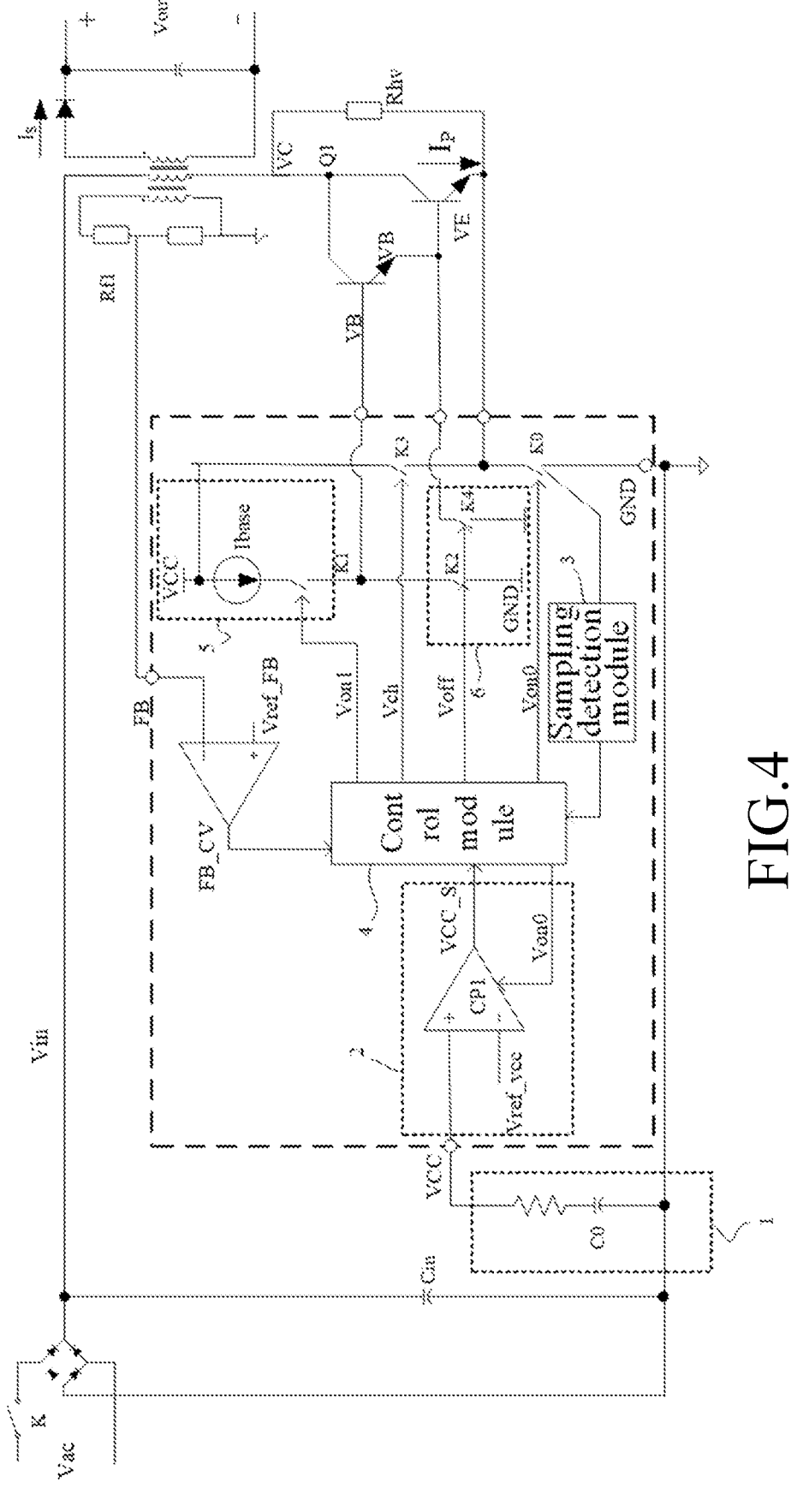
FIG. 4 is a schematic diagram of an application scenario of an ESR topology AC-DC power chip in a specific embodiment of this disclosure.

The charging detection module 2 is connected with an energy storage module 1, wherein the charging detection module 2 is configured to detect a power supply voltage VCC of the energy storage module 1 and generate a self-charging signal VCC_S when the power supply voltage VCC is lower than a self-charging threshold Vref_vcc. The implementation mode of the charging detection module 2 is not limited. For example, it can be composed of a conventional voltage sampling detection module and a voltage comparison circuit. Referring to FIG. 4, in this embodiment, the charge detection module 2 preferably adopts a latch comparator CP1, wherein one input terminal of the latch comparator CP1 receives the self-charging threshold Vref_vcc, the other terminal of the latch comparator CP1 is connected to an output terminal of the energy storage module 1, and a control terminal of the latch comparator CP1 is connected to the control module 4. The latch comparator CP1 is configured to detect the power supply voltage VCC of the energy storage module 1, compare the power supply voltage VCC with the self-charging threshold, generate the self-charging signal VCC_S, latch the newly generated self-charging signal VCC_S, and output the self-charging signal VCC_S to the control module 4 under a trigger of the control module 4 at an beginning of a next switching-on cycle. That is, the self-charging signal VCC_S is not outputted immediately, but sent to the control module 4 at the beginning of each switching-on cycle. The control module 4 can use a control signal which is sent to the current sampling switch K0 by the control module 4 itself to synchronously trigger the latch comparator CP1 to output the latched signal to itself.

The drive tube Q1 and the current sampling switch tube KO are connected in series between an input power supply and ground. Specifically, an input terminal of the drive tube Q1 is connected with the input power supply, and an output terminal of the drive tube Q1 is grounded through the current sampling switch tube K0. The input power supply which is connected with the drive tube Q1 is mainly AC power supply. Referring FIG.4, For example, one primary terminal of a transformer in an AC-DC power supply system can be directly connected to an external input power supply Vin, while the other primary terminal of the transformer can be connected to the input terminal of the drive tube Q1. Current which flows into the drive tube Q1 is inductive current $I_p$. The drive tube Q1 is switched periodically, and its operation cycle consists of a switching-on cycle and a switching-off cycle. The operation cycle and the peak value of the inductive current $I_p$ are determined according to the energy supply demand. For example, taking the application of FIG. 4 as an example, the operation cycle and the peak value of the inductive current $I_p$ of the drive tube Q1 is affected by a load at the secondary winding.

An input terminal of the charging switch tube K3 is connected between the drive tube Q1 and the current sampling switch tube K0, and an output terminal of the charging switch tube K3 is connected with the energy storage module 1.

An input terminal of the sampling detection module 3 is connected between the drive tube Q1 and the current sampling switch tube K0 to acquire a current which flows from the drive tube Q1 to the current sampling switch tube K0 for generating a sampled voltage Vcs. The sampling detection module 3 can use a resistor to realize the current sampling and detection function.

The control module 4 is connected with an output terminal of the sampling detection module 3 to acquire the sampled voltage Vcs, and is connected with an output terminal of the charging detection circuit and a control terminal of the charging switch tube K3 to control the drive tube Q1 to periodically and alternately enter a switching-on cycle and a switching-off cycle, based on the sampled voltage Vcs.

Wherein, each time the control module 4 enters the switching-on cycle, if the control module 4 fails to receive the self-charging signal VCC_S, the control module 4 is configured to be in a first switching-on control state after entering the switching-on cycle.

wherein, each time the control module 4 enters the switching-on cycle, if the control module 4 receives the self-charging signal VCC_S; the control module 4 is configured to be in the first switching-on control state after entering the switching-on cycle, and to be switched to a second switching-on control state after the drive tube Q1 is completely switched on for using a small current which flows through the drive tube Q1 during an early stage to charge the energy storage module 1 (thus implementing the charging of the whole circuit or chip) and to be switched back to the first switching-on control state after a preset charging duration.

Wherein the first switching-on control state represents switching on the current sampling switch tube K0 and switching off the charging switch tube K3, while the second switching-on control state represents switching off the current sampling switch tube K0 and switching on the charging switch tube K3.

On the one hand, in the normal operation state without charging, the charging switch tube K3 is switched off by a clock, and the control module 4 implements a feedback control on the drive tube Q1 based on the sampled voltage Vcs to enable the drive tube Q1 to be periodically in the switching-on cycle and the switching-off cycle. Specifically, when the power supply voltage VCC is normal and requires no charging, ending the switching-off cycle of the drive tube Q1 and entering the switching-on cycle of the drive tube Q1 are generally triggered by a pulse frequency mode of the control module in the chip, while ending the switching-on cycle of the drive tube Q1 and entering the switching-off cycle of the drive tube Q1 is realized by the feedback control of the control module 4 according to the sampled voltage Vcs.

On the other hand, in order to realize the charging of the whole circuit or chip without affecting the normal switching cycle of the drive tube Q1 and the normal energy transfer of the current Ip, this disclosure uses the small current during the early stage of the switching-on cycle of one or more switching-on cycles to charge the energy storage module 1 when charging is required. Specifically, each time the control module 4 enters one switching-on cycle, if the control module 4 receives the self-charging signal VCC_S, the control module 4 is configured to be in the first switching-on control state for a preset start duration tO after entering the switching-on cycle, wherein the time duration of the preset start duration tO is longer enough to guarantee that the drive tube Q1 is completely switched on. Because the main purpose of the preset start duration t0 is to make the drive tube Q1 to be completely switched on, it is generally about 300 ns, no more than 400 ns. Because our purpose is to charge with the small current flowing through the drive tube in the early stage, we immediately switch to the second switching-on control state after entering the switching-on cycle for preset start duration t0. The second switching-on control state maintains for a preset charging duration t1 which never exceed 30% of the duration of the switching-on cycle. Of course, in this case, the ending of the switching-off cycle and the entering of the switching-on cycle of the drive tube Q1 are consistent with the previous normal operation state of the drive tube Q1, which are both triggered by the pulse frequency mode inside the control module of the chip.

In an embodiment of this disclosure, the control module 4 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module.

Figure 3:
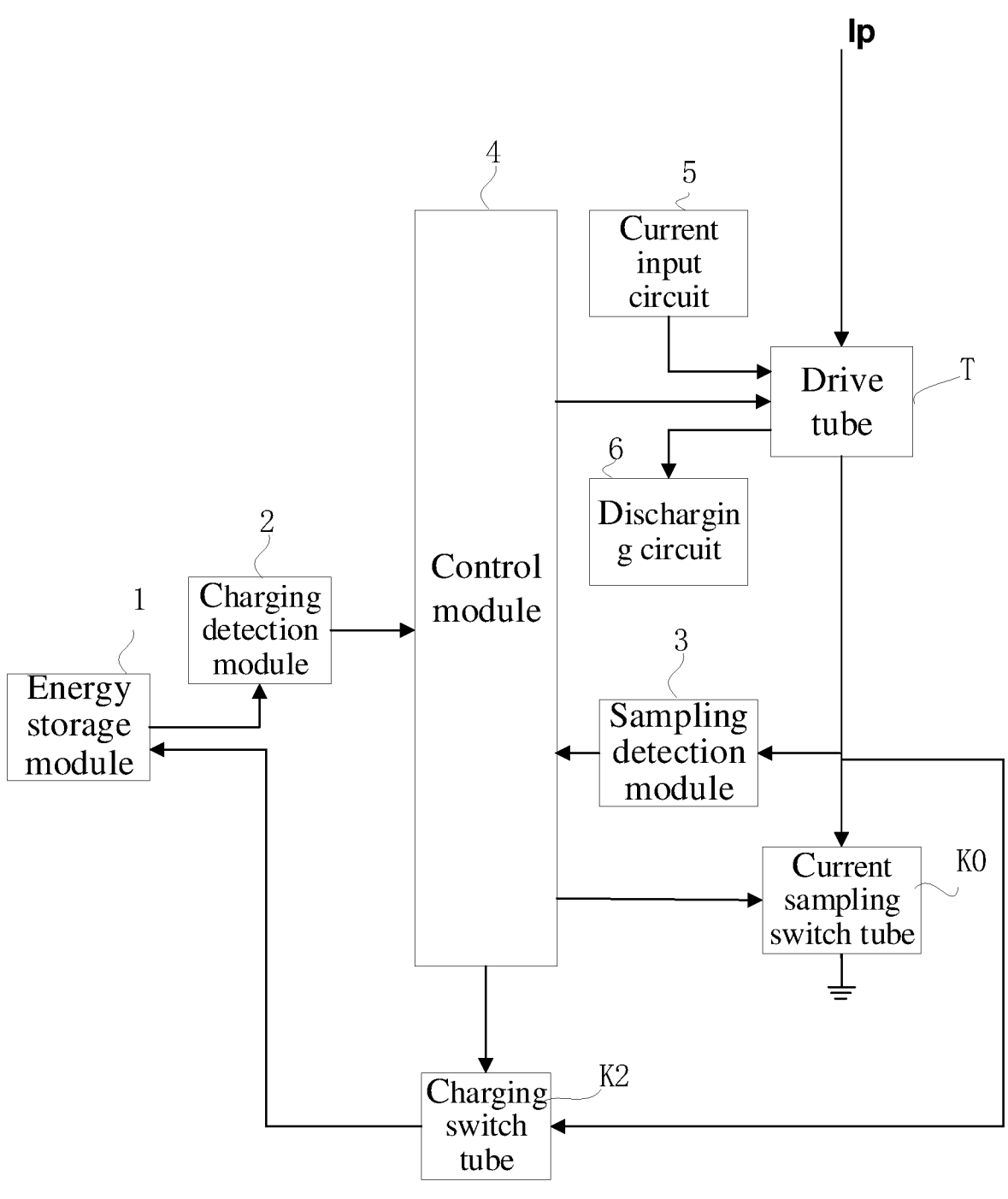
FIG. 3 is a structural diagram of a power supply drive circuit according to a further preferable embodiment of this disclosure.

The drive tube Q1 selected in this embodiment needs a current input to drive its control terminal before it can be switched on. As shown in FIG. 3, a current input circuit 5 is connected to the control terminal of the drive tube Q1, and the current input circuit 5 is configured to input a current to drive the drive tube Q1 to switch on. When we switch off the drive tube Q1, we first cut off the current input. For example, in each switching-on cycle, when the sampled voltage Vcs reaches a first reference voltage, we cut off the current input circuit 5 to stop driving the drive tube Q1. However, even if the input current is cut off, the drive tube Q1 is not completely switched off at this time, and the current which flows through the drive tube Q1 continues increasing until the drive tube Q1 is completely switched off. However, after cutting off the input current at the control terminal of the drive tube Q1, we do not allow it to slowly reach the complete switching-off state. Because if so, the peak value of the current $I_p$, when the drive tube Q1 is completely switched off, may not necessarily conform to our energy supply, and the peak value is uncontrollable. Referring to FIG. 3, preferably, in order to make the peak value of the current $I_p$ to be controllable and satisfy the energy output requirements, we further designed a discharging circuit 6, which is connected with the control terminal of the drive tube Q1 for discharging the control terminal of the drive tube Q1. Specifically, after stopping driving the drive tube Q1, when the sampled voltage Vcs continues increasing to a second reference voltage, we switch off the current sampling switch tube K0 and synchronously control the discharging circuit 6 to discharge, so that the drive tube Q1 can be forcibly and completely switched off.

Therefore, in general, the control module 4 is specifically configured to operate as follows.

On one hand, under the normal operation state without receiving the self-charging signal VCC_S, in each switching-on cycle, the control module 4 switches on the current input circuit 5 and the current sampling switch tube K0, and synchronously switches off the discharging circuit 6, and maintains the switching-off of the charging switch tube K3. When the sampled voltage Vcs reaches a first reference voltage, the control module 4 switches off the current input circuit 5 for stopping driving the drive tube Q1, and switches off the current sampling switch tube K0 and synchronously controls the discharging circuit 6 to discharge for forcibly and completely switching off the drive tube Q1 to enable the drive tube Q1 to enter the switching-off cycle when the sampled voltage Vcs continues to increase to a second reference voltage.

On the one hand, each time one self-charging signal VCC_S is received, in the each subsequent switching-on cycle, a preset charging duration tl is configured for charging until the current self-charging signal VCC_S is removed. The beginning time of the charging in each switching-on cycle, is chosen at a time which is after the complete switching-on time of the drive tube, which is approximately at waiting for a preset start duration t0 after "switching on the current input circuit 5 and the current sampling switch tube K0, and synchronously switching off the discharging circuit 6". Then the current sampling switch tube K0 and the current input circuit 5 are switched off and the charging switch tube is switched on for starting charging. After waiting for the preset charging duration t1, the current sampling switch tube K0 and the current input circuit 5 are switched on again and the charging switch tube K3 is switched off again. After that, when the sampled voltage Vcs reaches the first reference voltage, the current input circuit 5 is switched off for stopping driving the drive tube Q1. When the sampled voltage Vcs continues to increase to a second reference voltage, the current sampling switch tube KO is switched off and the discharging circuit 6 is synchronously controlled to discharge for forcibly and completely switching off the drive tube Q1 to enable the drive tube Q1 to enter the switching-off cycle If the switching-off cycle ends and the subsequent switching-on cycle arrives, and the self-charging signal VCC_S is still maintained, the closely followed switching-on cycle performs the above operations again, and so on, until the self-charging signal VCC_S is removed. For example, if the self-charging signal VCC_S is generated during the $i_{th}$ operation cycle (no matter it is in the switching-on cycle or the switching-off cycle in the $i_{th}$ operation cycle), the self-charging signal VCC_S is detected when entering the $i+1_{th}$ switching-on cycle, so the charging operation is implemented during early stage of the $i+1_{th}$ switching-on cycle. If the self-charging signal is still maintained at the end of the $i+1_{th}$ switching-on cycle, and then the self-charging signal is still maintained after one switching-off cycle and has not disappeared, then the self-charging signal is detected when entering the $i+2_{th}$ switching-on cycle, and the charging operation is implemented during early stage of the $i+2_{th}$ switching-on cycle. Then the self-charging signal is still maintained after one switching-off cycle and has not disappeared, and the charging operation is implemented during early stage of the $i+3_{th}$ switching-on cycle, and so on, until the self-charging signal VCC_S disappears. After the self-charging signal VCC_S disappears, the drive tube Q1 returns to the normal operation state.

The switching-on and switching-off time of each switch and circuit in one integral operation cycle is summarized as follows.

1) When a pulse frequency mode of the control module 4 is trigged, the control module 4 switches on the current input circuit 5 and the current sampling switch tube K0, and synchronously switches off the discharging circuit 6, and maintains the switching-off of the charging switch tube K3. At this time, a switching-on cycle begins.

If there is no self-charging signal VCC_S when entering the current switching-on cycle, the current input circuit 5 is switched off when the sampled voltage Vcs reaches the first reference voltage. When the sampled voltage Vcs continues increasing to the second reference voltage, the current sampling switch tube KO is switched off and the discharge circuit 6 is synchronously switched on to start discharging. At this time, the switching-on cycle ends.

If there is a self-charging signal VCC_S when entering the current switching-on cycle, wait for the preset start duration t0 after switching on the current sampling switch tube K0. Then the current input circuit 5 and the current sampling switch tube K0 are switched off and the charging switch tube K3 is switched on for charging. After waiting for the preset charging duration t1, the current sampling switch tube K0 and the current input circuit 5 are switched on again and the charging switch tube is switched off again. After that, when the sampled voltage Vcs reaches the first reference voltage, the current input circuit 5 is switched off for stopping driving the drive tube Q1. When the sampled voltage Vcs continues to increase to a second reference voltage, the current sampling switch tube K0 is switched off and the discharging circuit 6 is synchronously controlled to discharge. At this time, the switching-on cycle ends.

2) After the switching-on cycle ends, the switching-off cycle starts, in which wait for the next trigger to enter the switching-on cycle again.

Referring to FIG. 4, a specific circuit example is given below by taking ESR topology AC-DC power supply chip integrated with power supply drive circuit according to an embodiment of the present disclosure as an example. The AC-DC power supply chip includes a power supply drive chip and a drive tube Q1, and the AC-DC power supply chip is externally connected with an energy storage module 1 (such as the capacitor C0) and the likes. Preferably, the drive tube Q1 is a Darlington transistor. The AC-DC power chip includes a chip voltage pin VCC, a feedback pin FB, a ground pin GND, two drive tube control pins and one drive tube output pin. The input terminal of the drive tube Q1 is connected with a positive pole of the external input power supply through a primary side of the transformer. The bases of the two transistors of the drive tube Q1 are respectively connected to corresponding drive tube output pins. The output terminal of the drive tube Q1 is connected to the drive tube output pin. The ground pin GND is connected with a negative pole of the external input power supply. The energy storage module 1 is connected to the chip voltage pin VCC, and the feedback pin FB is connected to the partial voltage on the secondary side of the auxiliary winding. Based on this voltage division, the output voltage can be determined.

Specifically, the drive tube Q1 includes a primary transistor and a secondary transistor, the discharging circuit 6 includes a first discharging switch K2 and a second discharging switch K4. Specifically, the current sampling switch tube K0, the first discharging switch K2 and the second discharging switch K4 are NMOS tubes in this embodiment. The first discharging switch K2 is connected between a base of the primary transistor and ground, the second discharging switch K4 is connected between a base of the secondary transistor and ground, wherein the discharging circuit 6 discharges when the first discharging switch K2 and the second discharging switch K4 are switched on simultaneously.

Preferably, the current input circuit 5 includes a current source Ibase and a current input switch K1, wherein the current source Ibase takes electrical power from the power supply voltage VCC to generate a current, the current input switch K1 is connected between the base of the primary transistor and the current source Ibase, wherein when the current input switch K1 is switched on, the drive tube Q1 is switched on by the drive current inputted by the current input circuit 5. Specifically, the current input switch K1 is PMOS tube PM1 in this embodiment.

Preferably, the charging switch tube K3 is a PMOS tube, and a start resistor Rhv is connected between the input terminal and the output terminal of the drive tube Q1. The input power supply is configured to charge the energy storage module 1 through the start resistor Rhv and a parasitic diode of the charging switch tube K3 when powering up, wherein the power supply drive circuit starts to operate when the power supply voltage VCC increases to a preset voltage which is preset inside the control module 4, for guaranteeing the power supply of the whole circuit or chip.

Figure 5:
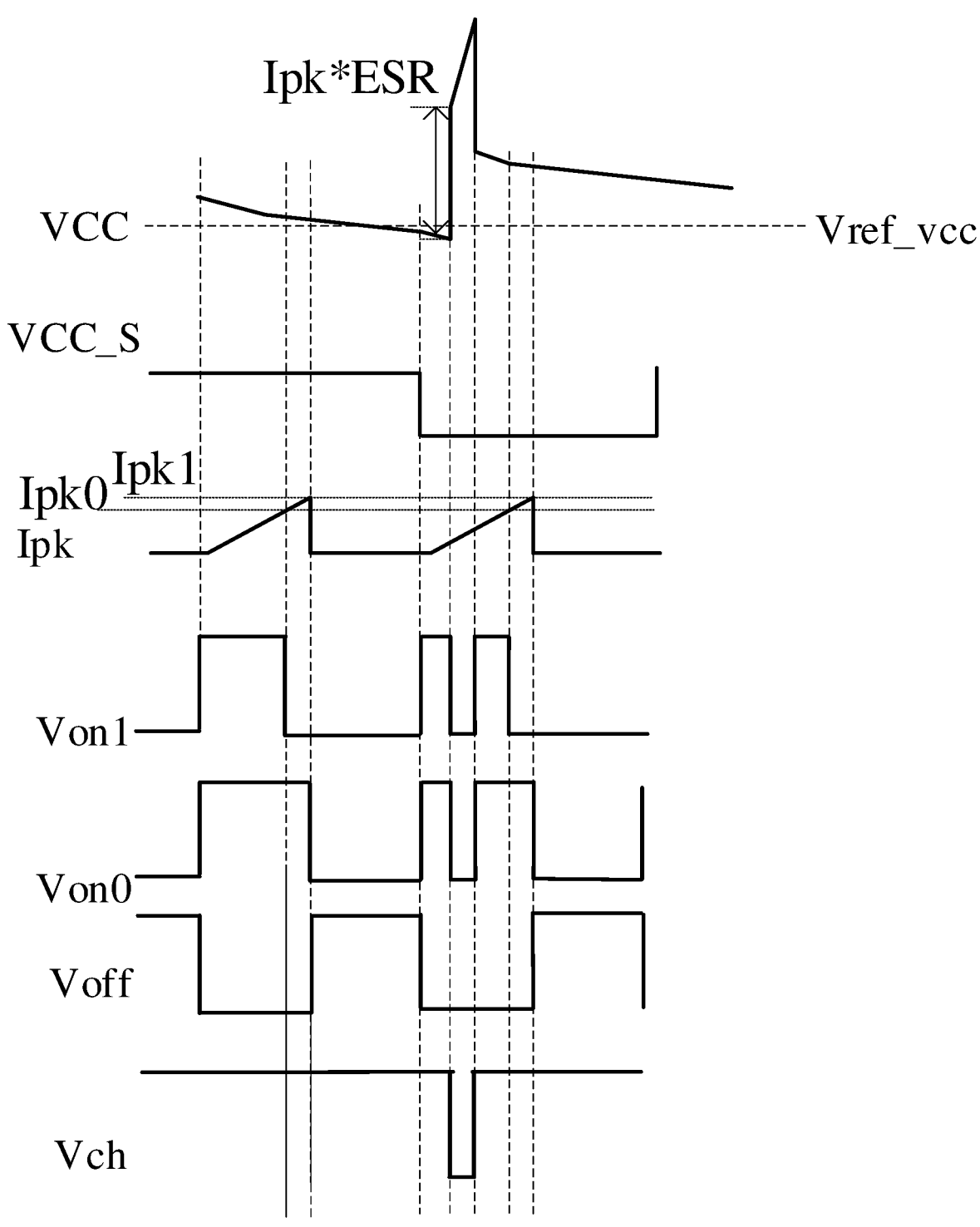
FIG. 5 is an operation waveform diagram of the circuit shown in FIG. 4.

The following describes the complete operation principle of this disclosure with a specific example in combination with FIGS. 4 and 5.

1) When the chip is powered on, the external input power Vin is turned on. The capacitor C0 is charged through the start resistor Rhv by the external input power Vin. When the voltage VCC on the capacitor C0 reaches a preset voltage set internally by the control module 4, the chip starts to operate. After the chip starts operation, the drive tube Q1 is periodically switched on and off. When the drive tube Q1 is switched on, the primary inductor of the transformer is charged. When the drive tube Q1 is switched off, the energy stored in the primary inductor is transferred to the output winding inductor and the auxiliary winding inductor.

2) After the chip starts operation, at the beginning of each switching-on cycle, whether the VCC voltage is normal, is determined. The chip determines whether the capacitor C0 is charged in this cycle according to a level of the self-charging signal VCC_S.

As shown in FIG.5, at the rising edge of the control signal Von1 at the first operation cycle, the self-charging signal VCC_S has a high level, which means the VCC voltage is high and no charging is required. The control signal Von1 and control signal Von0 both have a high level, and the drive tube Q1 is switched on. The primary current $I_P$ enters one terminal of the current sampling switch tube K0 and flows from the current sampling switch tube K0 to the ground GND. When the primary current $I_P$ increases to a current value ipk0 (meaning that the sampled voltage VCs reaches the first reference voltage), the control signal Von1 is turned off, which makes the current Ibase flowing into the base of the drive tube Q1 become zero. However, due to the delay characteristic of switching-off of the drive tube Q1, the drive tube Q1 remains the switching-on state for hundreds of nanoseconds to a few microseconds. The primary current $I_P$ still increases according to the original flow path. When the primary current $I_P$ increases to a current value ipk1 (meaning that the sampled voltage VCs reaches the second reference voltage), the control signal Voff turns over to a high level, thus rapidly discharging the charge stored at the base of the drive tube Q1, causing the drive tube Q1 to be switched off immediately and then transferring the energy on the primary inductor to the output load.

As shown in FIG.5, at the rising edge of the control signal Von1 at the second operation cycle, the self-charging signal VCC_S has a low level, which means the VCC voltage is low and a charging is required. The control signal Von1 and control signal Von0 both have a high level, and the drive tube Q1 is switched on. The primary current $I_P$ enters one terminal of the current sampling switch tube K0 and flows from the current sampling switch tube K0 to the ground GND. The control signal Von1 and control signal Von0 both turn over to a low level after a preset start duration t0 since the time when the drive tube Q1 is switched on. Meanwhile, the charging switch tube K3 is switched on by the control signal Vch, thus preventing the primary current $I_P$ from flowing through the current sampling switch tube K0 and forcing this current to flow through the charging switch tube K3 for charging the capacitor C0. Wait for a preset charging duration t1 since the time when the charging switch tube K3 is switched on, the charging switch tube K3 is switched off by the control signal Vch. Meanwhile, the control signal Von1 and control signal Von0 both turn over to a high level, and the primary current $I_P$ comes back to the terminal of the current sampling switch tube K0 and flows from the current sampling switch tube K0 to the ground GND. When the primary current $I_P$ increases to a current value ipk0 (meaning that the sampled voltage VCs reaches the first reference voltage), the control signal Von1 is turned off, which makes the current Ibase which flows into the base of the drive tube Q1 become zero. However, due to the delay characteristic of switching-off of the drive tube Q1, the drive tube Q1 remains conducting state for hundreds of nanoseconds to a few microseconds. The primary current $I_P$ still increases according to the original flow path. When the primary current $I_P$ increases to a current value ipk1 (meaning that the sampled voltage VCs reaches the second reference voltage), the control signal Voff turns over to a high level, thus rapidly discharging the charge stored at the base of the drive tube Q1, causing the drive tube Q1 to be switched off immediately, and then transferring the energy on the primary inductor to the output load. It can be seen that, this disclosure just uses the small current between the t0 to t0+t1 time (that is, the t1 time) after the beginning of the switching-on cycle of the drive tube Q1 for charging, which can greatly save the area of the charging switch tube K3, and enables to employ the standard low-voltage CMOS process, greatly reduces the chip cost, greatly expands the application scope of the electrolytic capacitor ESR, and greatly saves the system BOM cost.

Based on the similar conception, a power supply drive method is provided, which including:

each time entering a switching-on cycle, if a power supply voltage is no lower than a self-charging threshold, configurating a first switching-on control state after entering the switching-on cycle, wherein the first switching-on control state represents switching on a current sampling switch tube and switching off a charging switch tube;

each time entering the switching-on cycle, if the power supply voltage is lower than the self-charging threshold, performing the first switching-on control state after entering the switching-on cycle firstly, and switching to a second switching-on control state after a drive tube is completely switched on for using a small current which flows through the drive tube during an early stage to charge an energy storage module, and then switching back to the first switching-on control state after a preset charging duration; wherein the second switching-on control state represents switching off the current sampling switch tube and switching on the charging switch tube.

One skilled in the art knows that such power supply drive method can be implemented based on the power supply drive circuit discussed above, and the method can be implemented by the control module 4 discussed above.

The power supply drive circuit, chip and method according to this disclosure has following technical effects. In each switching-on cycle, the charging demand is considered. If the current switching-on cycle requires charging, after the drive tube is completely switched on in the current switching-on cycle, the sampling switch tube is switched off and the charging switch tube is switched on for using the small current which flows through the drive tube in the early stage of the switching-on cycle for charging. In the later stage of the current switching-on cycle, the sampling switch tube is switched on and the charging switch tube is switched off, such that the current outputted by the drive tube flows through the current sampling switch tube according to the normal path. In this way, not only the power supply voltage never changes with the output power, the cumbersome design and debugging of the power supply circuit are avoid, but also the charging of the whole circuit or chip is realized without affecting the switching cycle of the drive tube. In addition, this charging method uses small currents of multiple cycles for charging, which greatly improves the influence of the energy storage capacitor ESR on the power supply voltage, effectively expands the ESR application scope, and enables to employ the standard low-voltage CMOS process. In additional, the energy storage module can be realized by replacing the expensive chip capacitor with the cheap electrolytic capacitor, which saves the system cost, improves the reliability and has wide applicability.

The embodiments of the present disclosure are described above in combination with the drawings, but the present disclosure is not limited to the above specific embodiments. The above specific embodiments are only schematic, not restrictive. Ordinary technicians in the art can make many forms under the enlightenment of the present disclosure and without departing from the scope of the purpose and claims of the present disclosure, and these are within the protection of the present disclosure.

The invention claimed is:

1. A power supply drive circuit, comprising:

a charging detection module, which is connected with an energy storage module, wherein the charging detection module is configured to detect a power supply voltage of the energy storage module and generate a self-charging signal when the power supply voltage is lower than a self-charging threshold;

a current sampling switch tube, which is connected with an output terminal of a drive tube, wherein an input terminal of the drive tube is connected with an input power supply and the output terminal of the drive tube is grounded through the current sampling switch tube;

a charging switch tube, wherein an input terminal of the charging switch tube is connected between the drive tube and the current sampling switch tube, and an output terminal of the charging switch tube is connected with the energy storage module;

a sampling detection module, wherein an input terminal of the sampling detection module is connected between the drive tube and the current sampling switch tube to acquire a current which flows from the drive tube to the current sampling switch tube for generating a sampled voltage; and a control module, which is connected with an output terminal of the sampling detection module to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;

wherein, each time the control module enters the switching-on cycle, if the control module fails to receive the self-charging signal, the control module is configured to be in a first switching-on control state after entering the switching-on cycle, wherein the first switching-on control state represents switching on the current sampling switch tube and switching off the charging switch tube;

wherein, each time the control module enters the switching-on cycle, if the control module receives the self-charging signal; the control module is configured to be in the first switching-on control state after entering the switching-on cycle, and to be switched to a second switching-on control state after the drive tube is completely switched on for using a current which flows through the drive tube during an early stage to charge the energy storage module, and to be switched back to the first switching-on control state after a preset charging duration; wherein the second switching-on control state represents switching off the current sampling switch tube and switching on the charging switch tube;

wherein each time the control module enters the switching-on cycle, if the control module receives the self-charging signal, the control module is configured to be in the first switching-on control state for a preset start duration after entering the switching-on cycle to guarantee that the drive tube is completely switched on, and then to be switched to the second switching-on control state.

2. The power supply drive circuit according to claim 1, wherein the preset start duration never exceeds 30% of the switching-on cycle or 400 ns, and/or the preset charging duration never exceeds 30% of the switching-on cycle.

3. The power supply drive circuit according to claim 1, wherein the preset start duration and the preset charging duration enable the sampled voltage to fail to reach a first reference voltage, when switching back to the first switching-on control state.

4. The power supply drive circuit according to claim 1, wherein the power supply drive circuit further comprises:

a current input circuit, which is connected with the control terminal of the drive tube, wherein the current input circuit is configured to input a drive current to switch on the drive tube; and a discharging circuit, which is connected with the control terminal of the drive tube, wherein the discharging circuit is configured to discharge the control terminal of the drive tube.

5. The power supply drive circuit according to claim 4, wherein each time the control module enters the switching-on cycle, the control module is specifically configured to synchronously switch on the current input circuit and switch off the discharging circuit when switching on the current sampling switch tube;

each time after the control module enters the switching-on cycle, the control module is specifically configured to synchronously switch off the current input circuit when the control module is switched to the second switching-on control state, to synchronously switch on the current input circuit when the control module is switched back to the first switching-on control state; and each time after the control module enters the switching-on cycle, the control module is specifically configured to switch off the current input circuit for stopping driving the drive tube when the sampled voltage reaches a first reference voltage and to switch off the current sampling switch tube and synchronously control the discharging circuit to discharge for forcibly and completely switching off the drive tube to enable the drive tube to enter the switching-off cycle when the sampled voltage continues to increase to a second reference voltage.

6. The power supply drive circuit according to claim 4, wherein the drive tube is a Darlington transistor, which includes a primary transistor and a secondary transistor, wherein the discharging circuit includes a first discharging switch and a second discharging switch;

wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

7. The power supply drive circuit according to claim 6, wherein the current input circuit includes a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

8. The power supply drive circuit according to claim 1, wherein the charging detection module includes a latch comparator, wherein one input terminal of the latch comparator receives the self-charging threshold, the other terminal of the latch comparator is connected to an output terminal of the energy storage module, and a control terminal of the latch comparator is connected to the control module;

wherein, the latch comparator is configured to detect the power supply voltage of the energy storage module, compare the power supply voltage with the self-charging threshold, generate the self-charging signal, latch a newly generated self-charging signal, and output the self-charging signal to the control module under a trigger of the control module at an beginning of a next switching-on cycle.

9. The power supply drive circuit according to claim 1, wherein further comprising a start resistor which is connected between the input terminal and the output terminal of the drive tube; wherein the input power supply is configured to charge the energy storage module through the start resistor and a parasitic diode of the charging switch tube when powering up, wherein the power supply drive circuit starts to operate when the power supply voltage increases to a preset voltage which is preset inside the control module.

10. A power supply drive chip comprising a power supply drive circuit, wherein the power supply drive circuit comprises:

a charging detection module, which is connected with an energy storage module, wherein the charging detection module is configured to detect a power supply voltage of the energy storage module and generate a self-charging signal when the power supply voltage is lower than a self-charging threshold;

a current sampling switch tube, which is connected with an output terminal of a drive tube, wherein an input terminal of the drive tube is connected with an input power supply and the output terminal of the drive tube is grounded through the current sampling switch tube;

a charging switch tube, wherein an input terminal of the charging switch tube is connected between the drive tube and the current sampling switch tube, and an output terminal of the charging switch tube is connected with the energy storage module;

a sampling detection module, wherein an input terminal of the sampling detection module is connected between the drive tube and the current sampling switch tube to acquire a current which flows from the drive tube to the current sampling switch tube for generating a sampled voltage; and a control module, which is connected with an output terminal of the sampling detection module to acquire the sampled voltage, and is connected with an output terminal of the charging detection circuit and a control terminal of the charging switch tube to control the drive tube to periodically and alternately enter a switching-on cycle and a switching-off cycle, based on the sampled voltage;

wherein, each time the control module enters the switching-on cycle, if the control module fails to receive the self-charging signal, the control module is configured to be in a first switching-on control state after entering the switching-on cycle, wherein the first switching-on control state represents switching on the current sampling switch tube and switching off the charging switch tube;

wherein, each time the control module enters the switching-on cycle, if the control module receives the self-charging signal; the control module is configured to be in the first switching-on control state after entering the switching-on cycle, and to be switched to a second switching-on control state after the drive tube is completely switched on for using a current which flows through the drive tube during an early stage to charge the energy storage module, and to be switched back to the first switching-on control state after a preset charging duration; wherein the second switching-on control state represents switching off the current sampling switch tube and switching on the charging switch tube;

wherein each time the control module enters the switching-on cycle, if the control module receives the self-charging signal, the control module is configured to be in the first switching-on control state for a preset start duration after entering the switching-on cycle to guarantee that the drive tube is completely switched on, and then to be switched to the second switching-on control state.

11. The power supply drive chip according to claim 10, wherein the preset start duration never exceeds 30% of the switching-on cycle or 400 ns, and/or the preset charging duration never exceeds 30% of the switching-on cycle.

12. The power supply drive chip according to claim 10, wherein the preset start duration and the preset charging duration enable the sampled voltage to fail to reach a first reference voltage, when switching back to the first switching-on control state.

13. The power supply drive chip according to claim 10, wherein the power supply drive circuit further comprises:

a current input circuit, which is connected with the control terminal of the drive tube, wherein the current input circuit is configured to input a drive current to switch on the drive tube; and a discharging circuit, which is connected with the control terminal of the drive tube, wherein the discharging circuit is configured to discharge the control terminal of the drive tube;

wherein each time the control module enters the switching-on cycle, the control module is specifically configured to synchronously switch on the current input circuit and switch off the discharging circuit when switching on the current sampling switch tube;

each time after the control module enters the switching-on cycle, the control module is specifically configured to synchronously switch off the current input circuit when the control module is switched to the second switching-on control state, to synchronously switch on the current input circuit when the control module is switched back to the first switching-on control state; and each time after the control module enters the switching-on cycle, the control module is specifically configured to switch off the current input circuit for stopping driving the drive tube when the sampled voltage reaches a first reference voltage and to switch off the current sampling switch tube and synchronously control the discharging circuit to discharge for forcibly and completely switching off the drive tube to enable the drive tube to enter the switching-off cycle when the sampled voltage continues to increase to a second reference voltage.

14. The power supply drive chip according to claim 13, wherein the drive tube is a Darlington transistor, which includes a primary transistor and a secondary transistor, wherein the discharging circuit includes a first discharging switch and a second discharging switch;

wherein the first discharging switch is connected between a base of the primary transistor and ground, the second discharging switch is connected between a base of the secondary transistor and ground, wherein the discharging circuit discharges when the first discharging switch and the second discharging switch are switched on simultaneously.

15. The power supply drive chip according to claim 14, wherein the current input circuit includes a current source and a current input switch, wherein the current source is configured to take electrical power from the power supply voltage to generate a current, the current input switch is connected between the base of the primary transistor and the current source, wherein when the current input switch is switched on, the drive tube is switched on by the drive current inputted by the current input circuit.

16. The power supply drive chip according to claim 10, wherein the charging detection module includes a latch comparator, wherein one input terminal of the latch comparator receives the self-charging threshold, the other terminal of the latch comparator is connected to an output terminal of the energy storage module, and a control terminal of the latch comparator is connected to the control module;

wherein, the latch comparator is configured to detect the power supply voltage of the energy storage module, compare the power supply voltage with the self-charging threshold, generate the self-charging signal, latch a newly generated self-charging signal, and output the self-charging signal to the control module under a trigger of the control module at an beginning of a next switching-on cycle.

17. The power supply drive chip according to claim 10, wherein further comprising a start resistor which is connected between the input terminal and the output terminal of the drive tube; wherein the input power supply is configured to charge the energy storage module through the start resistor and a parasitic diode of the charging switch tube when powering up, wherein the power supply drive circuit starts to operate when the power supply voltage increases to a preset voltage which is preset inside the control module.

18. A power supply drive method comprising each time entering a switching-on cycle, if a power supply voltage is no lower than a self-charging threshold, configurating a first switching-on control state after entering the switching-on cycle, wherein the first switching-on control state represents switching on a current sampling switch tube and switching off a charging switch tube;

each time entering the switching-on cycle, if the power supply voltage is lower than the self-charging threshold, configurating the first switching-on control state after entering the switching-on cycle firstly, and switching to a second switching-on control state after a drive tube is completely switched on for using a current which flows through the drive tube during an early stage to charge an energy storage module, and then switching back to the first switching-on control state after a preset charging duration; wherein the second switching-on control state represents switching off the current sampling switch tube and switching on the charging switch tube.

* * * * *